US008007361B2

(12) United States Patent
Walker et al.

(10) Patent No.: US 8,007,361 B2
(45) Date of Patent: Aug. 30, 2011

(54) FACILITATING A FLAT RATE PLAY SESSION WITH A PARALLEL GAME

(75) Inventors: Jay S. Walker, Ridgefield, CT (US); Jose A. Suarez, Fairfield, CT (US); James A. Jorasch, Westport, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 11/576,907

(22) PCT Filed: Nov. 9, 2006

(86) PCT No.: PCT/US2006/060742

§ 371 (c)(1), (2), (4) Date: Sep. 17, 2007

(87) PCT Pub. No.: WO2007/059418

PCT Pub. Date: May 24, 2007

(65) Prior Publication Data

US 2008/0305862 A1 Dec. 11, 2008

Related U.S. Application Data

(60) Provisional application No. 60/736,750, filed on Nov. 14, 2005.

(51) Int. Cl.
*A63F 13/00* (2006.01)

(52) U.S. Cl. .......................................... 463/25; 463/20

(58) Field of Classification Search .................... 463/16, 463/17, 18, 19, 20, 21, 25, 26, 27, 28; 273/138.2, 273/143 R
See application file for complete search history.

(56) References Cited

U.S. PATENT DOCUMENTS

| | | | | |
|---|---|---|---|---|
| 6,077,163 | A * | 6/2000 | Walker et al. | 463/26 |
| 6,443,452 | B1 * | 9/2002 | Brune | 273/143 R |
| 6,537,151 | B1 * | 3/2003 | Walker et al. | 463/25 |
| 6,743,097 | B2 * | 6/2004 | Walker et al. | 463/25 |
| 6,805,634 | B1 | 10/2004 | Wells | |
| 7,140,964 | B2 | 11/2006 | Walker et al. | |
| 7,229,353 | B2 * | 6/2007 | Seelig | 463/25 |
| 2003/0211878 | A1 * | 11/2003 | Walker et al. | 463/13 |
| 2004/0242319 | A1 * | 12/2004 | Walker et al. | 463/25 |
| 2005/0233791 | A1 * | 10/2005 | Kane | 463/6 |

OTHER PUBLICATIONS

PCT International Report for PCT/US06/60742 mailed Oct. 1, 2007, 3 pp.

PCT Written Opinion for PCT/US06/60742 mailed Jan. 1, 2007, 4 pp.

* cited by examiner

*Primary Examiner* — James S McClellan

(74) *Attorney, Agent, or Firm* — Fincham Downs, LLC; Magdalena M. Fincham

(57) ABSTRACT

A gaming device adapted to operate in a flat rate play mode has two credit meters. The first credit meter shows a credit balance associated with the flat rate play session. The second credit meter shows a concurrent credit balance associated with a parallel transactional play session. The player may cash out the balance of one, but not both credit meters.

22 Claims, 9 Drawing Sheets

100

| 102 | PROBABILITY 104 | FLAT RATE PAYTABLE PAYOUT | EXP. VALUE |
|---|---|---|---|
| ROYAL FLUSH | 0.002490% | 800 | 0.01992 |
| STRAIGHT FLUSH | 0.010770% | 50 | 0.005385 |
| FOUR OF A KIND | 0.236290% | 25 | 0.0590725 |
| FULL HOUSE | 1.151370% | 9 | 0.1036233 |
| FLUSH | 1.090160% | 6 | 0.0654096 |
| STRAIGHT | 1.123510% | 4 | 0.0449404 |
| THREE OF A KIND | 7.446270% | 3 | 0.2233881 |
| TWO PAIR | 12.929840% | 2 | 0.2585968 |
| ONE PAIR | 21.507060% | 1 | 0.2150706 |
| NOTHING | 54.502240% | 0 | 0 |
| | | PAYBACK: (106) | 99.54% (108) |

FIG. 5

| 102 | PROBABILITY 104 | TRANSACTIONAL PAYTABLE PAYOUT | EXP. VALUE |
|---|---|---|---|
| ROYAL FLUSH | 0.002490% | 17 | 0.0004233 |
| STRAIGHT FLUSH | 0.010770% | 10 | 0.001077 |
| FOUR OF A KIND | 0.236290% | 6 | 0.0141774 |
| FULL HOUSE | 1.151370% | 3 | 0.0345411 |
| FLUSH | 1.090160% | 4 | 0.0436064 |
| STRAIGHT | 1.123510% | 3 | 0.0337053 |
| THREE OF A KIND | 7.446270% | 2 | 0.1489254 |
| TWO PAIR | 12.929840% | 2 | 0.2585968 |
| ONE PAIR | 21.507060% | 1 | 0.2150706 |
| NOTHING | 54.502240% | 0 | 0 |
| | | PAYBACK: (106) | 75.01% (108) |

FIG. 6

FACILITATING A FLAT RATE PLAY SESSION WITH A PARALLEL GAME

The present application claims the benefit of priority of PCT/US06/60742 filed Nov. 9, 2006 entitled "FACILITATING A FLAT RATE PLAY SESSION WITH A PARALLEL GAME," which claims priority to and the benefit of U.S. Provisional Patent Application Ser. No. 60/736,750 filed Nov. 14, 2005. The disclosure of both the PCT and provisional applications are incorporated by reference in its entirety.

The present disclosure is related to gaming and more particularly to gaming devices that allow flat rate play.

Slot machines (inclusive of video poker style machines) generate large volumes of revenue for casinos and, in general, have been found to generate more than half of the gaming revenue for most casinos in the United States. In light of the importance of slot machines to the gaming industry, it behooves casinos to provide new and varied slot machines so as to attract and maintain slot players.

SUMMARY OF THE INVENTION

In accordance with one or more embodiments, a gaming device conducts a game of chance such as video poker in which each outcome generated (such as a flush or full house) results in a payout determination from two distinct payout tables. Each outcome generated by the gaming device during a flat rate play mode of operation results in a first paytable being used to determine a first payout that is added to a first credit meter balance and a second paytable being used to determine a second payout that is added to a second credit meter balance.

In some embodiments, the cost of each hand may be accounted for in both of these meters as well. In other words, in some embodiments, an initiation of a hand results in a wager amount for the hand being deducted from the first credit meter balance and the wager amount also being deducted from the second credit meter balance. In some embodiments, the wager amount deducted from the first balance is equivalent to the wager amount being deducted from the second credit meter balance.

In some embodiments, the player is able to select a final balance from one of the two credit meters. In other words, in some embodiments, a player associated with the two credit meter balances may cash out one, but not both, of the credit meter balances. In some embodiments, different rules regarding the cash out event may apply to the two distinct credit meter balances. For example, in some embodiments, the first credit meter balance may be cashed out at any time while the second credit meter balance my only be cashed out upon one or more qualifying events occurring (e.g., an end of a duration of a flat rate play session being reached).

BRIEF DESCRIPTION OF THE DRAWINGS

FIG. 5 illustrates an exemplary paytable for a flat rate gaming session;

FIG. 6 illustrates an exemplary paytable for a transactional session;

DETAILED DESCRIPTION OF THE INVENTION

Embodiments of the present disclosure are directed to a gaming device, which is adapted to provide a flat rate play mode to players. Flat rate video poker, described in at least U.S. Pat. No. 6,077,163 and U.S. Patent Application Publication No. 2002/0147040, filed Nov. 2, 2001, each of which is incorporated by reference herein for all purposes, offers the player a predetermined amount of game play ("session") for a fixed price, and the player is guaranteed not to lose any more than this purchase amount.

When the player is playing in the flat rate play mode, the gaming device concurrently runs two credit meters. The first credit meter reflects the cash out value for the flat rate play session. Credits are subtracted from this credit meter for each game start, and credits are added to this credit meter based on a readily accessible paytable. In part to assure the player and regulators that the machine is true to a regulated minimum payback (e.g., 75% for Nevada), the second credit meter reflects a cash out value that would be available to the player if the player were playing under a transactional play session. That is, credits are deducted from the second credit meter for each game start, and credits are added to the second credit meter according to a second paytable that conforms to the regulatory minimums. Players can see how they are doing in the flat rate session relative to the concurrently tabulated results for an equivalent number of game starts under a transactional rule set. Thus, the player and regulators are reassured that the gaming device is compliant with the jurisdiction's regulation minimum paybacks.

Figure 1:
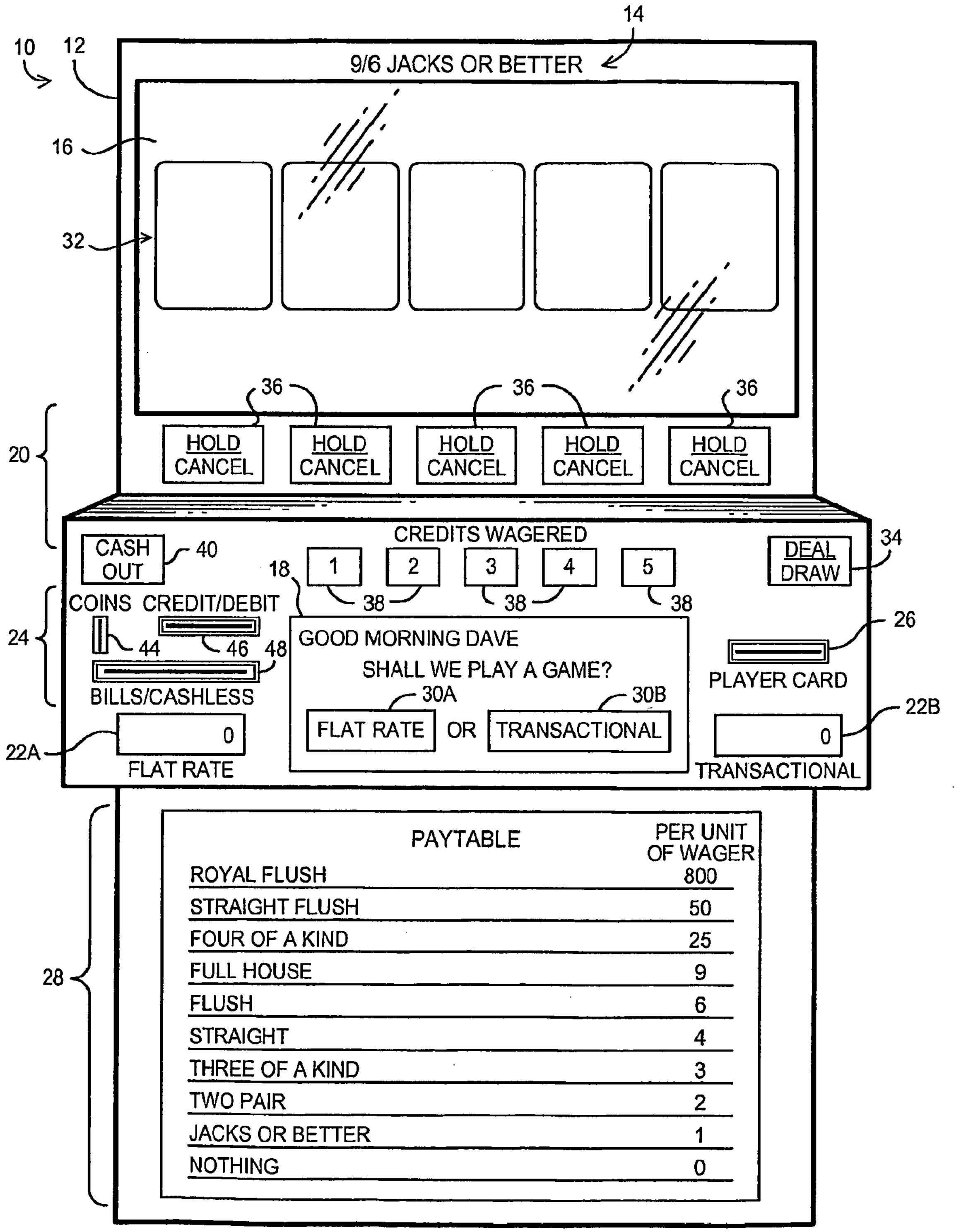
FIG. 1 illustrates a front elevational view of a gaming device suitable for use with some embodiments.

FIG. 1 illustrates a front elevational view of a gaming device 10, which is, as illustrated, a video poker machine that may be used in accordance with some embodiments. The gaming device 10 includes a housing 12 boasting game name indicia 14 and a primary display 16 on which the game action is presented. A secondary display 18 presents images and text to provide supplemental information or instructions to the player as practical or desired.

An input keypad 20 includes a plurality of buttons through which the player may provide input to the gaming device 10. Flat rate credit meter 22A displays a current total of credits available to the player if the player were to conclude a flat rate play session. Transactional credit meter 22B displays a current total of credits available to the player for immediate cash out based on a transactional paytable. Credits may be established by the player through the use of an equity input mechanism 24 or through game play as will be further described herein.

A player-tracking mechanism 26 may be used to identify a player at the gaming device 10, which, in turn, may allow messages on the secondary display 18 to be personalized, comp points posted to the player profile, and the like. Belly glass paytable display 28 provides a listing of the paytable used by the gaming device 10 in its current mode of operation. Collectively, the displays 16, 18, 28, input keypad 20, credit meter 22, equity input mechanism 24 and player-tracking mechanism 26 may be thought of as a user interface 50 (see FIG. 2) for the gaming device.

The secondary display 18 may display an attraction screen or, as illustrated, a mode selection screen with touch buttons 30A and 30B that allow a player to select between modes of operation for the gaming device 10. In particular, a player may use touch buttons 30A, 30B to select between a flat rate mode and a transactional mode.

The primary display 16 presents, in this exemplary embodiment, a player hand 32. When not actively conducting game play, the gaming device 10 may present an attraction screen or video clip designed to draw attention to the gaming device 10 and entice a player to begin game play on the gaming device 10.

As illustrated, the player hand 32 includes indicia representative of the five cards dealt to the player at the beginning of video poker game play. During game play, animations of cards being dealt may be presented, and the cards then displayed on the card indicia in response to the player establishing equity and pressing the "deal/draw" button 34. The player may designate cards to be held through "hold/cancel" buttons 36 which correspond to respective cards on the primary display 16. The player may then discard the non-held cards and receive replacement cards by pressing the "deal/draw" button 34 again. The resulting hand is compared to the paytable, and a benefit is provided to the player if appropriate. More detail on conducting game play is provided below.

The primary display 16, secondary display 18, the credit meter 22, and/or the belly glass 28 may be an LED, LCD, CRT, a touch screen display, or other appropriate display type as practical or desired. In an alternate embodiment, the belly glass 28 is a static display and is merely indicia painted, etched, or otherwise affixed to a glass panel.

As intimated above, input keypad 20 includes "deal/draw" button 34 and "hold/cancel" buttons 36. Indicia providing a textual or visual clue as to the play command may be presented on the buttons 34, 36 as is well understood.

Input keypad 20 may further include credit wager buttons 38. As defined herein in the section entitled Rules of Interpretation presented below, the gaming device 10 operates using units of wager. Each credit herein corresponds to a unit of wager. The player may select how many units of wager are to be bet by pressing the corresponding credit wager button 38. In this exemplary embodiment, one through five units of wager may be bet by the player. In other embodiments, more or fractional units of wager may be bet by the player as practical or desired. Note that input keypad 20 may be actual mechanical buttons or incorporated into a touch screen display as practical or desired.

Input keypad 20 may still further include a cash out button 40. During flat rate play, but before conclusion of a flat rate play session, pressing the cash out button 40 causes the balance on the transactional credit meter 22B to be dispensed to the player. Pressing the cash out button 40 at the conclusion of the flat rate play session causes the balance on the flat rate credit meter 22A to be dispensed to the player if the balance is positive. Alternatively, the player may be queried (e.g., such as through the secondary display 18) as to which credit meter is to be used to determine the benefit provided to the player. As still another alternative, the higher value of the two credit meters is provided to the player on detection of use of the cash out button 40.

The equity input mechanism 24 may include a coin acceptor 44, a magnetic card reader 46, a paper acceptor 48 and/or the like. Magnetic card reader 46 may accept credit, debit or other form of card including a smart card or the like. The paper acceptor 48 may accept bills in appropriate denominations and/or be a cashless gaming receipt acceptor. Still further the paper acceptor 48 may print cashless gaming receipts. Alternatively benefits may be output through a coin hopper (not shown) or through a dedicated cashless gaming receipt printer (also not shown) as is well understood in the slot industry. While not shown, the equity input mechanism 24 could include a radio frequency identification (RFID) interrogator that interoperates with a player-controlled transponder (e.g., incorporated into a key fob or the like). The interrogator could retrieve an account number (e.g., a credit card account, a bank account, or the like) from the transponder and establish equity therethrough. As yet another alternative, the player may use a cellular phone (or other mobile terminal) and call a number displayed on the gaming device 10. The gaming device 10 may then bill the cellular phone account of the player. As yet another option, the mobile terminal may communicate with the gaming device 10 through some other protocol (e.g., BLUETOOTH™ or WI-FI™) and provide account information to the gaming device 10 such that the account may be billed as practical or desired. A dongle with an electronic wallet stored thereon, or other similar structure could be used in conjunction with an appropriate dongle port. Still other mechanisms for establishing equity may be used if practical or desired, such as providing credits in exchange for filling out a survey. In place of providing a benefit through the coin hopper or a cashless gaming receipt, funds may be credited to an account that was used to establish equity (e.g., a credit applied to a cellular phone account, direct deposit to a bank, and the like) or other account associated with the player (e.g., such as an account associated with a player-tracking profile).

The player-tracking mechanism 26 may be a magnetic card reader into which the player inserts a magnetic stripe player-tracking card. While illustrated as a magnetic card reader, it should be appreciated that the player-tracking mechanism 26 could be a smart card reader, a bar code reader, a dongle port, or other mechanism such as a wireless interrogator that interrogates a RFID device such as a transponder positioned in a key chain fob or the like. In still another embodiment, the player-tracking mechanism 26 may be a biometric input such as a fingerprint reader, a retinal scanner, or the like. Such inputs may be accompanied by a keypad for PIN entry if practical or desired. Acknowledgement of use of a player-tracking device may be made on the secondary display 18 or other location as practical or desired.

Figure 2:
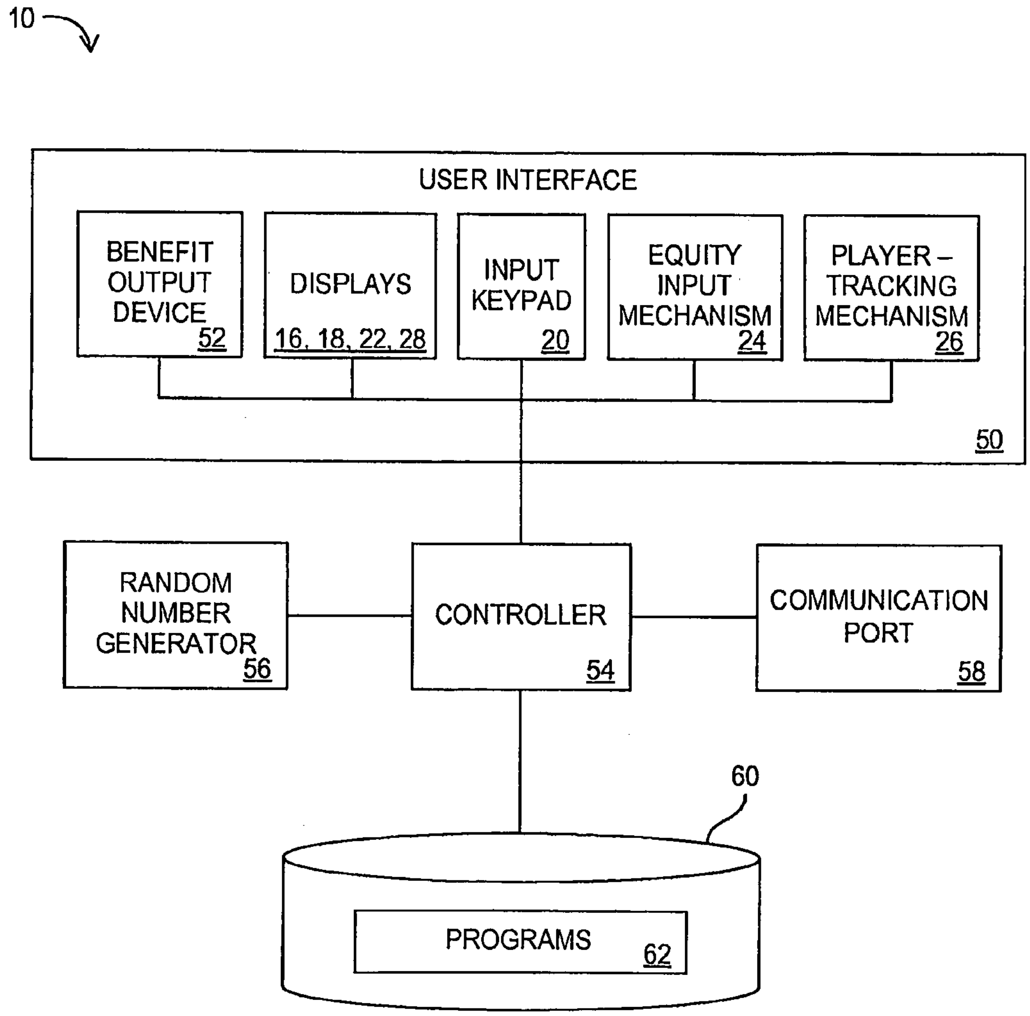
FIG. 2 illustrates a block diagram schematic of the gaming device of FIG. 1.

A block diagram of the gaming device 10 is illustrated in FIG. 2. In particular, the gaming device 10 includes the user interface 50, which includes the displays 16, 18, 22, 28, the input keypad 20, the equity input mechanism 24, the player-tracking mechanism 26, and a benefit output device 52 (e.g., the coin hopper or cashless receipt printer). The user interface 50 is operatively coupled to a controller 54. The controller 54 may further be operatively coupled to a random number generator 56 and a communication port 58. Memory 60 with programs 62 stored therein is further operatively associated with the controller 54. The elements of the gaming device 10 may communicate over a wirebased bus (not shown explicitly) or wirelessly as practical or desired. The controller 54 with memory 60 and the programs 62 is a control system as that term is defined in the Rules of Interpretation.

Note that while the user interface 50 has been described in terms of discrete buttons and displays, it is possible, as alluded to above, that the buttons of the input keypad 20 may be incorporated into one or more displays through the use of a touch screen. Extending this concept, the touch screen may include menus and active buttons from which a player may select various options relating to her gaming experience. An exemplary option may be supplemental audio played through speakers on the gaming device 10. This option may be selected from a menu. Such menus may be WINDOWS® style drop down menus that appear when a player touches a particular portion of the touch screen, selectively enabled through the actions of the player, or otherwise made available as practical or desired. Once the menu appears, the touch screen may make the menu active such that a player may make a selection from the menu by touching the area of the screen on which the option appears. While a WINDOWS® style menu option is possible, other presentations are also possible. Instead of audio, video could also be selected through such menus and then presented on one or more of the displays. As is readily understood, such a touch screen may require a touch screen controller with the menus stored in appropriate memory devices (e.g., memory 60) associated with the gaming device 10. Likewise, the content that is selected from such menus must be available either locally or remotely so that the gaming device 10 may present such content. In some embodiments, the display of such menus may preempt the display of other information. For example, in one embodiment, the menus may appear on a display 28 and, when the menus are active, the paytable illustrated in FIG. 1 may be obscured by the menus. Other arrangements are also contemplated.

The controller 54 may be positioned within the housing 12 of the gaming device 10. Memory 60 may also be positioned within the housing 12 and may be a computer readable medium as that term is defined in the Rules of Interpretation. The software programs 62 include instructions for making the controller 54 operate. The software programs 62 may be stored in a compressed, uncompiled, and/or encrypted format. The software programs 62 may include program elements that are necessary for operation of the controller 54 such as an operating system, a database management system, device drivers, and the like. The software programs 62 may be uploaded into the memory 60 through any appropriate mechanism such as installation from a floppy, CD, or DVD drive, downloaded from a network through communication port 58, or other mechanism as is well understood. While not explicitly illustrated, memory 60 may store a probability database. Exemplary paytable databases are illustrated in FIGS. 5 & 6 and may be stored in the memory 60. The book "Professional Video Poker" by Stanford Wong (Pi Yee Press, 1993) illustrates examples of payout and probability tables and how they may be derived. The entirety of this book is incorporated by reference herein.

The random number generator 56 (as well as any other random number generator described herein), in accordance with at least one embodiment, may generate data representing random or pseudo-random values (referred to as "random numbers" herein). The random number generator 56 may generate a random number every predetermined unit of time (e.g., every second) or in response to a game start on the gaming device 10. In the former embodiment, the generated random numbers may be used as they are generated (e.g., the random number generated at substantially the time of game initiation is used for that game) and/or stored for future use in the memory 60.

The random number generator 56, as used herein, may be embodied as a processor separate from but working in cooperation with controller 54. Alternatively, the random number generator 56 may be embodied as an algorithm, program component, or software program 62 stored in the memory 60 or other device and used to generate a random number.

Note that, although the generation or obtainment of a random number is described herein as involving the random number generator 56, other methods of determining a random number may be employed. For example, a gaming device owner or operator may obtain sets of random numbers that have been generated by another entity. HotBitS™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The communication port 58 may connect the gaming device 10 to a communication network 64 (FIG. 3) through any appropriate communication medium and protocol. An exemplary communication port 58 is an Ethernet port that connects the gaming device 10 to an internet protocol (IP) network.

While not illustrated, some of the components of the gaming device 10 may be embodied as a peripheral device that is operatively associated with the gaming device 10. Such peripheral devices may be mounted on or positioned proximate to the housing 12 of the gaming device 10 as practical or desired. Such peripheral devices may be particularly useful in retrofitting functionality into the gaming device 10. Alternatively, a retrofit package may be assembled including new belly glass and an EPROM or EEPROM chip that is installed in the memory 60 with the new programs 62 that enable the functionality of one or more embodiments. The new chip may replace an existing chip within the gaming device 10, be added to a printed circuit board, or otherwise communicatively coupled to the controller 54 to effectuate embodiments disclosed herein. Such retrofits may allow the gaming device 10 to operate in a transactional mode or a flat rate mode. Such different modes may be selected by the player or other decision making entity. Such selection may be made through a touch sensitive screen, which is configured to output a prompt asking the player to select a mode of operation (e.g., touch buttons 30A & 30B). Such a prompt may be output in response to various trigger conditions (e.g., coins, bills or tickets are inserted; a credit balance increases from zero to some other number; a player presses a deal/draw button 34; a motion, weight, infrared, or other sensor detects the presence of the player; and the like). Accordingly, a player may select a mode of operation (e.g., by pressing an appropriately labeled touch button 30A or 30B), and upon receiving the player's selection, the gaming device 10 may be configured to operate in the selected mode.

In still further embodiments, rather than configure existing gaming devices to execute aspects of the present disclosure by installing or connecting new hardware and/or software, software may be downloaded into an existing memory of one or more gaming devices 10. U.S. Pat. No. 6,805,634 to Wells et al. teaches methods for downloading data to gaming devices in such a manner. The entirety of the '634 patent is hereby incorporated by reference in it is entirety.

Figure 3:
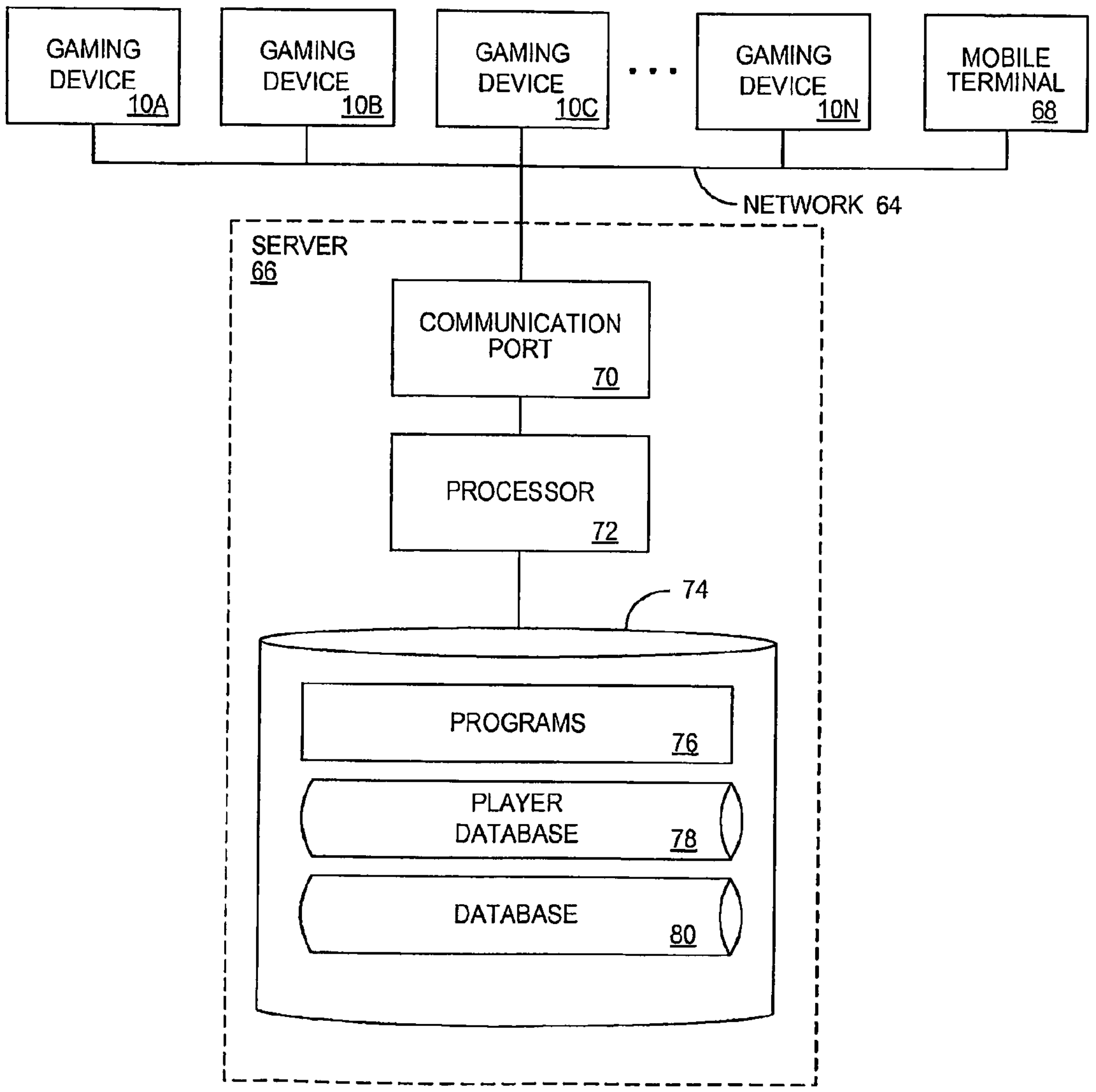
FIG. 3 illustrates a server based gaming environment suitable for use with some embodiments.

The gaming device 10 may be a stand-alone device or it may be connected to the network 64 as better illustrated in FIG. 3. For example, gaming devices 10A-10N may be connected through the network 64 to a server 66. Additionally a mobile terminal 68 may be connected to the network 64. More information on the mobile terminal 68 and its operation within the network 64 is provided below with reference to FIG. 4. Network 64 is a network as that term is defined in the Rules of Interpretation.

The server 66 may include a communication port 70 adapted to couple operatively the server 66 to the network 64 and a processor 72. The processor 72 may be operatively coupled to memory 74 with programs 76 stored thereon. A player database 78 and other databases 80 may further be stored on the memory 74 as practical or desired. The processor 72 coupled with the programs 76 is a control system as that term is defined in the Rules of Interpretation.

The server 66 may perform some of the functionality previously attributed to the gaming device 10. That is, the gaming devices 10 may act as client devices for the server 66 with most of the processing and decision making occurring on the server 66. In such an instance, the processor 72 is operatively coupled to the user interface 50 through the network 64 and acts as the control system for the gaming device 10. The memory 74 may store additional databases, including, but not limited to: a game database that stores information regarding one or more games playable on and/or downloadable to one or gaming devices 10, and a scheduling and/or configuration database useful for determining which games are to be made available on which gaming devices 10 at what times. In other embodiments, some or all of these functions may be handled by a device distinct from the server 66, but remotely positioned relative to the gaming devices 10.

In place of the payout and probability databases being present in the gaming devices 10, such databases and/or data may instead be stored in the databases 80 of the memory 78. Likewise, the databases may be distributed and/or duplicated between various devices within the network 64.

The programs 76 may allow the server 66 to track gambling, gaming, or other activity performed at the gaming device 10, track gaming or other activities of individual players, instruct a gaming device 10 to perform one or more functions (e.g., output a message to a player, interrupt play, or the like), assign or otherwise determine a unique identifier for a player, and/or control access to stored funds and/or a credit line. In some embodiments the server 66 may be operable to configure a gaming device 10 remotely, update software stored on a gaming device 10, and/or download software or software components to a gaming device 10. For example, the server 66 may be operable to apply a hot fix to software stored on a gaming device 10, modify a payout and/or probability table stored on a gaming device 10, and/or transmit a new version of software and/or a software component to a gaming device 10. The server 66 may be programmed to perform any or all of the above functions as practical or desired and may do so based on, for example, an occurrence of an event (e.g., a scheduled event), receiving an indication from authorized gaming establishment personnel, an authorized third party (e.g., a regulator) and/or receiving a request from a player. In other embodiments, some or all of these functions may be handled by a device distinct from the server 66.

While the previous paragraph describes the server 66 configuring the gaming device 10, it is also possible that the server 66 stores games thereon, and these games are requested from the gaming device 10. The gaming device 10 may be programmed to check periodically if updates are available, and, if an update is available, download and install the update. Alternatively, the gaming device 10 may check on occurrence of an event, an indication from authorized gaming establishment personnel, an indication from an authorized third party, or the like. It is particularly contemplated that the gaming device 10 may be a thin client controlled by the server 66, although such is not required for operation.

Figure 4:
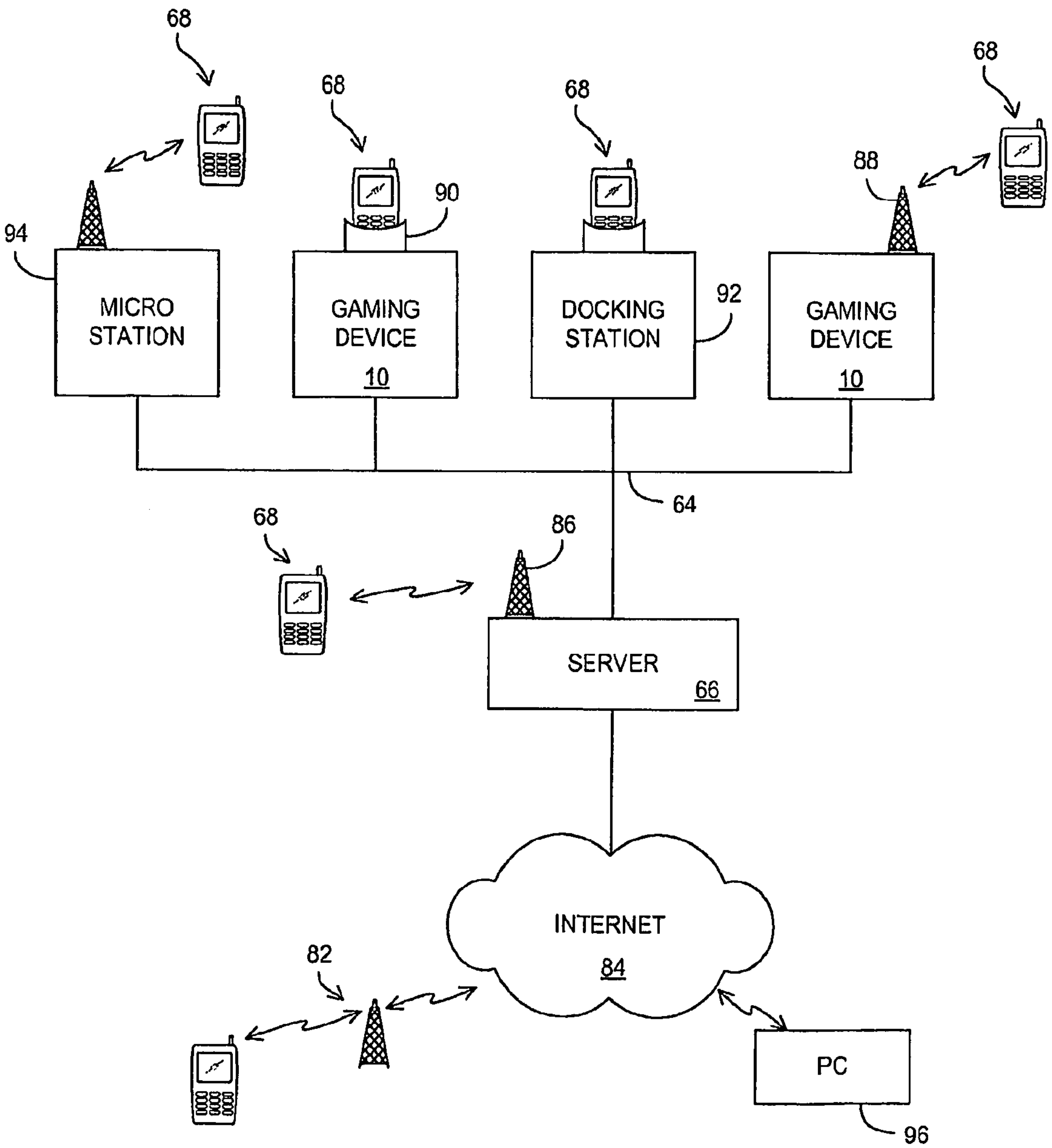
FIG. 4 illustrates exemplary techniques through which a mobile terminal may be networked into a communication system so as to implement one or more embodiments.

In some embodiments, game play may be conducted on a mobile terminal 68 instead of a gaming device 10. FIG. 4 illustrates a variety of techniques through which the mobile terminal 68 may be so used. The illustrated techniques are intended to be exemplary and non-limiting. The mobile terminal 68 may be a cellular telephone, a personal digital assistant (such as a PALM® or BLACKBERRY™ device), a two way pager, a portable computer, a handheld gaming device (such as a wireless device marketed by DIAMOND I, INC.), or the like as practical or desired. In short, the mobile terminal 68 may be a device dedicated to gambling or a multipurpose device such as a cellular phone on which games may be played as practical or desired. The mobile terminal 68 includes a user interface including a keypad, microphone, speaker, and display. The mobile terminal 68 further includes a controller or processor with corresponding software stored in a local memory that acts as a control system as that term is defined in the Rules of Interpretation. Alternatively, the user interface of the mobile terminal 68 may be controlled by a remotely positioned control system such as the processor 72.

In one embodiment, the mobile terminal 68 may communicate through a wireless network 82 (e.g., such as the public land mobile network (PLMN)) to the internet 84, and through the internet 84 to an online casino server (not shown explicitly) or other server 66. In such an embodiment, the mobile terminal 68 may be equipped with a web browser (e.g., FIREFOX, MOZILLA, NETSCAPE NAVIGATOR, INTERNET EXPLORER, etc.) to interoperate with the online casino. While the internet 84 is contemplated, the public switched telephone network (PSTN) or other communication network may be used in place thereof as practical or desired. Alternatively, the mobile terminal 68 may download the game from such a server and the game may be played locally.

As yet another option, the mobile terminal 68 may instead communicate with elements of the network 64. In one embodiment, the mobile terminal 68 communicates with the server 66 through an antenna 86 coupled to the server 66 using an appropriate wireless protocol. In a second embodiment (not shown), the mobile terminal 68 may dock directly with the server 66 using appropriate docking technology. Note that this embodiment may require appropriate security and firewalls since the player will have essentially direct access to the server 66. In another embodiment, the mobile terminal 68 may communicate with a gaming device 10 through an antenna 88. Note that the antenna 88 may be coupled to the gaming device 10 through a peripheral device. In still another embodiment, the mobile terminal 68 may dock with the gaming device 10 through a docking cradle 90. Again, the docking cradle 90 may be incorporated into a peripheral device. In yet another embodiment, a dedicated docking station 92 may be provided, and the mobile terminal 68 may be coupled to the network 64 through the docking station 92. In yet another embodiment, a cellular microstation 94 may be communicatively coupled to the network 64 and the mobile terminal 68 may interoperate with the microstation 94. Other arrangements are also contemplated.

Instead of conducting game play on the mobile terminal 68, the mobile terminal 68 may form part of a user interface. For example, a player may use the display 16 of a gaming device 10, but issue commands related to game play through the mobile terminal 68. Again, the mobile terminal 68 may communicate with the gaming device 10 using any appropriate mechanism.

FIG. 4 also illustrates a remote computer (PC) 96 that may be connected to the server 66 through the internet 84 or other network. Such an arrangement may be appropriate where the server 66 hosts an online gaming website and the computer 96 accesses the website to effectuate the game play described herein. As described above, software may be downloaded to the PC 96 as practical or desired.

In conjunction with embodiments of the present disclosure, two payout tables are used. These payout tables may be stored in a payout database within the gaming device 10, on the server 66, or other location as practical or desired. The payout database may be a paytable database containing the information presented in the display 28 in such a manner that the hand at the player hand 32 may be compared thereto and a benefit for the player determined. Such a paytable database may include an attribute entry defining an attribute, a threshold for the attribute above which the player has qualified for a winning outcome, and a benefit entry which may include a number of credits, comp points, or other value to be awarded to the player. Other arrangements are also possible. Note that the benefit may be a cash value benefit, a comp point, a free game start, an element such as a token redeemable for a free game start, a bonus game start, access to an improved paytable, access to some form of premium play, a ticket to a show, a ticket for a discount at a restaurant, or the like. Note that the premium play may be selected from a menu, which may include forms of insurance, improved paytables, reduced wager requirements, and the like.

FIG. 5 illustrates the flat rate paytable 100. The flat rate paytable 100 includes the outcome field 102, the probability field 104, the payout field 106, and the expected value field 108. Note that not all of these fields are required, but they are included herein so that the reader may ascertain the math behind the present disclosure. The outcome field 102 lists the composition of the hand in terms of winning poker hands according to well understood poker rules. The probability field 104 lists the probability that a given outcome will occur assuming perfect play by the player. The payout field 106 lists the benefit provided to the player in response to a particular outcome. Note that the value in the payout field 106 is a number of credits awarded per credit wagered. For example, if a player wagered three credits, and received a flush, the player would receive eighteen (three times six) credits as a benefit. The expected value field 108 is the probability multiplied by the payout. As evidenced by the values in the flat rate payout table 100, the flat rate paytable 100 has a payback percentage of 99.54%, well above the regulatory minimums.

FIG. 6 illustrates the transactional paytable 110 that is used to calculate benefits applied to the transactional credit meter 22B. The transactional paytable 110 has the same fields 102, 104, 106, and 108. In contrast to the flat rate paytable 100, the payout has been set to provide a payback of 75.01%, just above the Nevada regulatory minimum. Other transactional paytables could be used if practical or desired.

Figure 7:
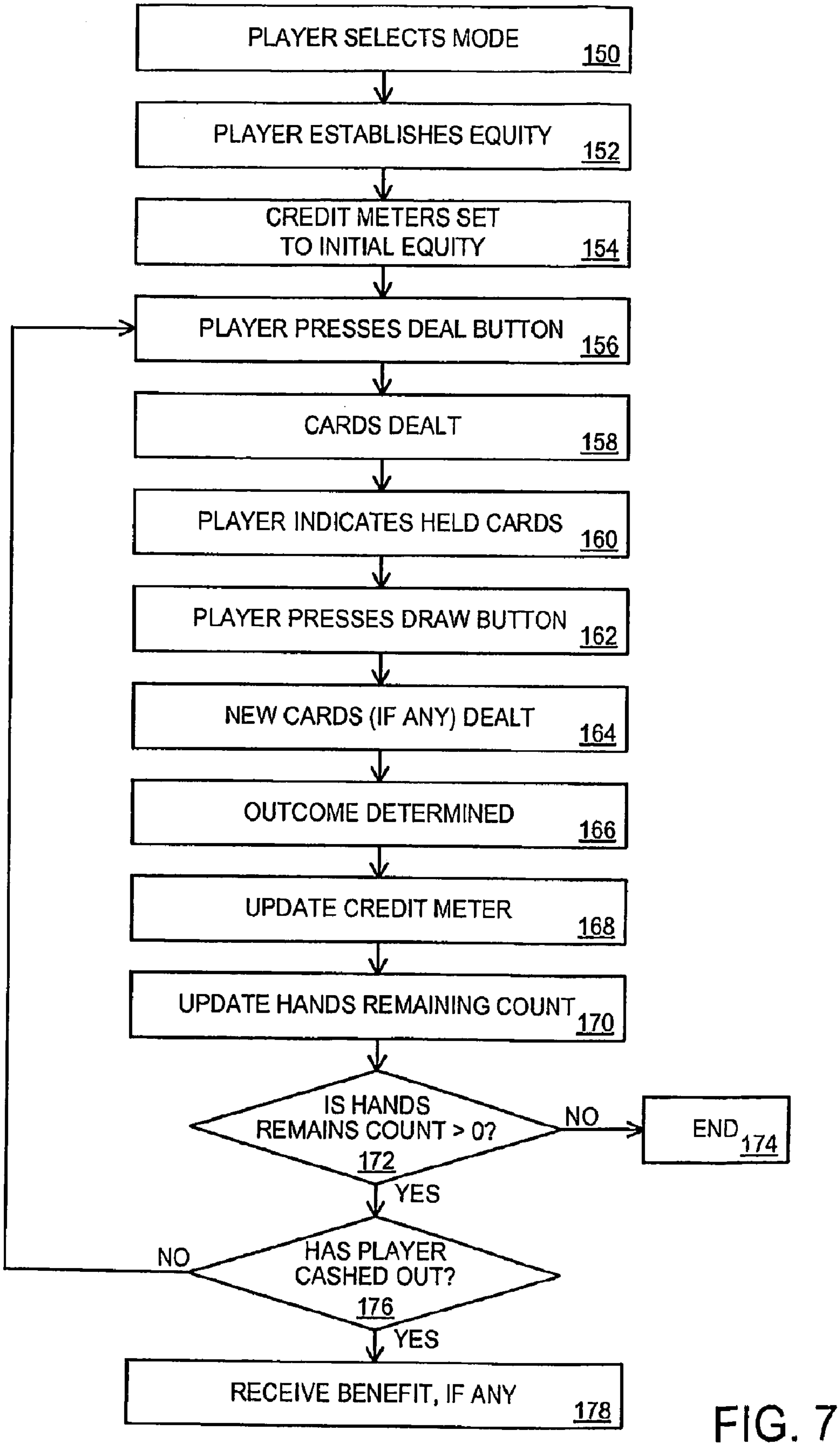
FIG. 7 illustrates a flow chart of an exemplary embodiment of the methodology.

Against this backdrop of hardware and software, an exemplary method is presented in FIG. 7. For the sake of this example, assume the gaming device 10 is a 9/6 Jacks of Better Quarter (twenty-five cents) unit of wager video poker gaming device. The maximum bet is five units of wager (i.e. one dollar twenty-five cents). The method starts when the player approaches the gaming device 10, perhaps drawn in by an attraction screen or the like. The player may activate the player tracking mechanism 26. The gaming device 10 presents a query as to which mode the player would like to play (e.g., by presenting a query on the secondary screen 18, see FIG. 1). The player selects the desired mode (block 150). For the sake of example, the player selects a flat rate mode, such as by touching the flat rate touch button 30A. The player establishes equity with the gaming device 10 (block 152). The player may do so by inserting coins, bills, a cashless receipt, or other technique as described above. Since the player has selected a flat rate play session, the player provides the contract price for the flat rate play session. For the sake of example, the player is purchasing four hundred hands of video poker for $40.

Figure 8:
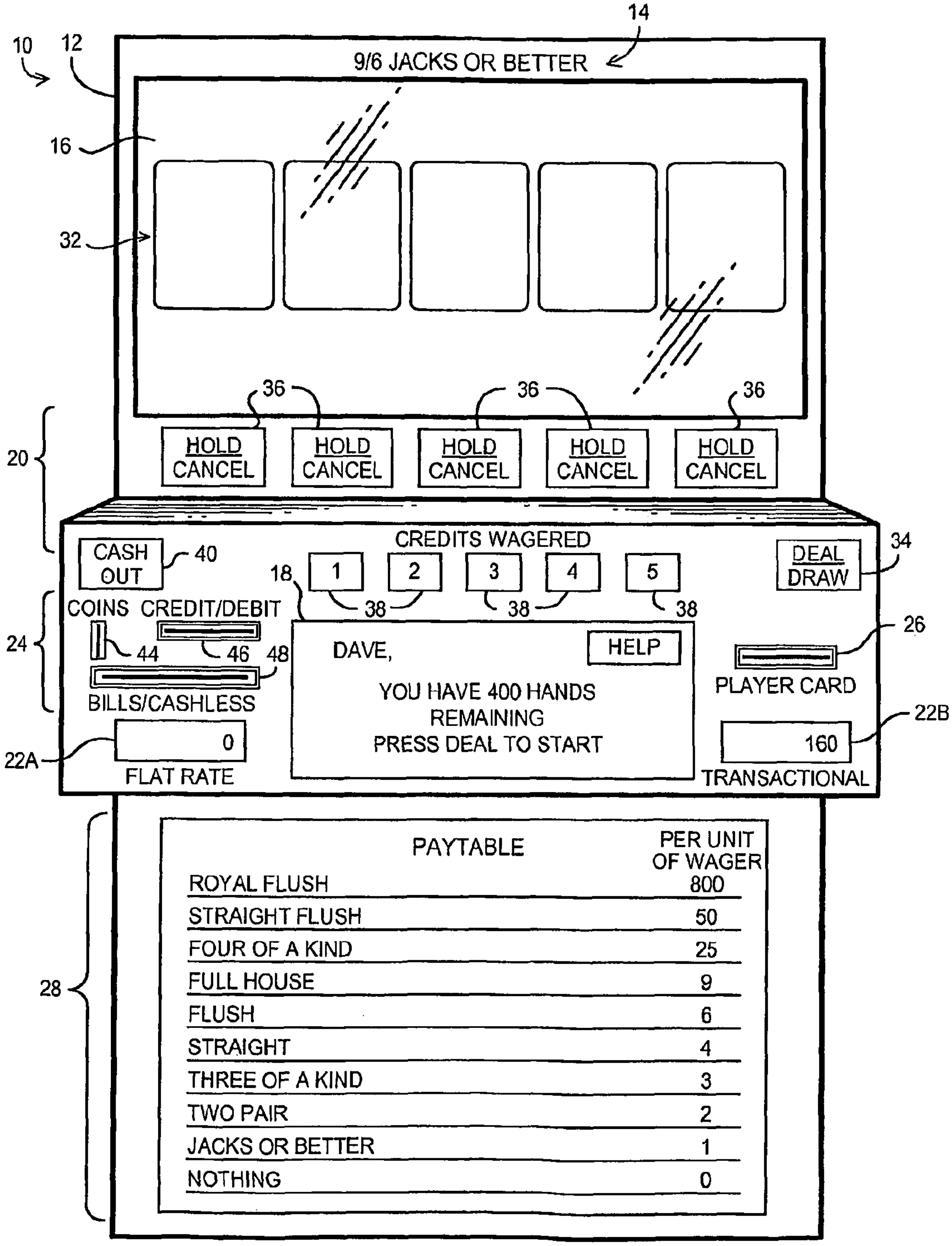
FIG. 8 illustrates an exemplary gaming device after the player establishes equity.

The credit meters are set to reflect the initial equity (block 154). That is, the flat rate credit meter 22A is set to zero and the transactional credit meter 22B is set to one hundred sixty ($40×4 units of wager/$=160 units of wager or 160 credits). See FIG. 8 which reflects state of the gaming device 10 at this point. Note that the secondary display 18 also displays the number of hands available to the player and provides an instruction on how to proceed as well as a touch button link to a help menu. As an alternative, the number of hands available could be presented in the primary display 16.

The player presses the deal/draw button 34 (block 156). The cards are dealt (block 158). The player indicates which cards are to be held by pressing the corresponding hold/cancel buttons 36 (block 160). The player presses the deal/draw button 34 again (block 162). This causes the held cards to be held and the other cards to be discarded with replacement cards being dealt (block 164). The outcome is determined (block 166) and reference is made to the paytables.

Figure 9:
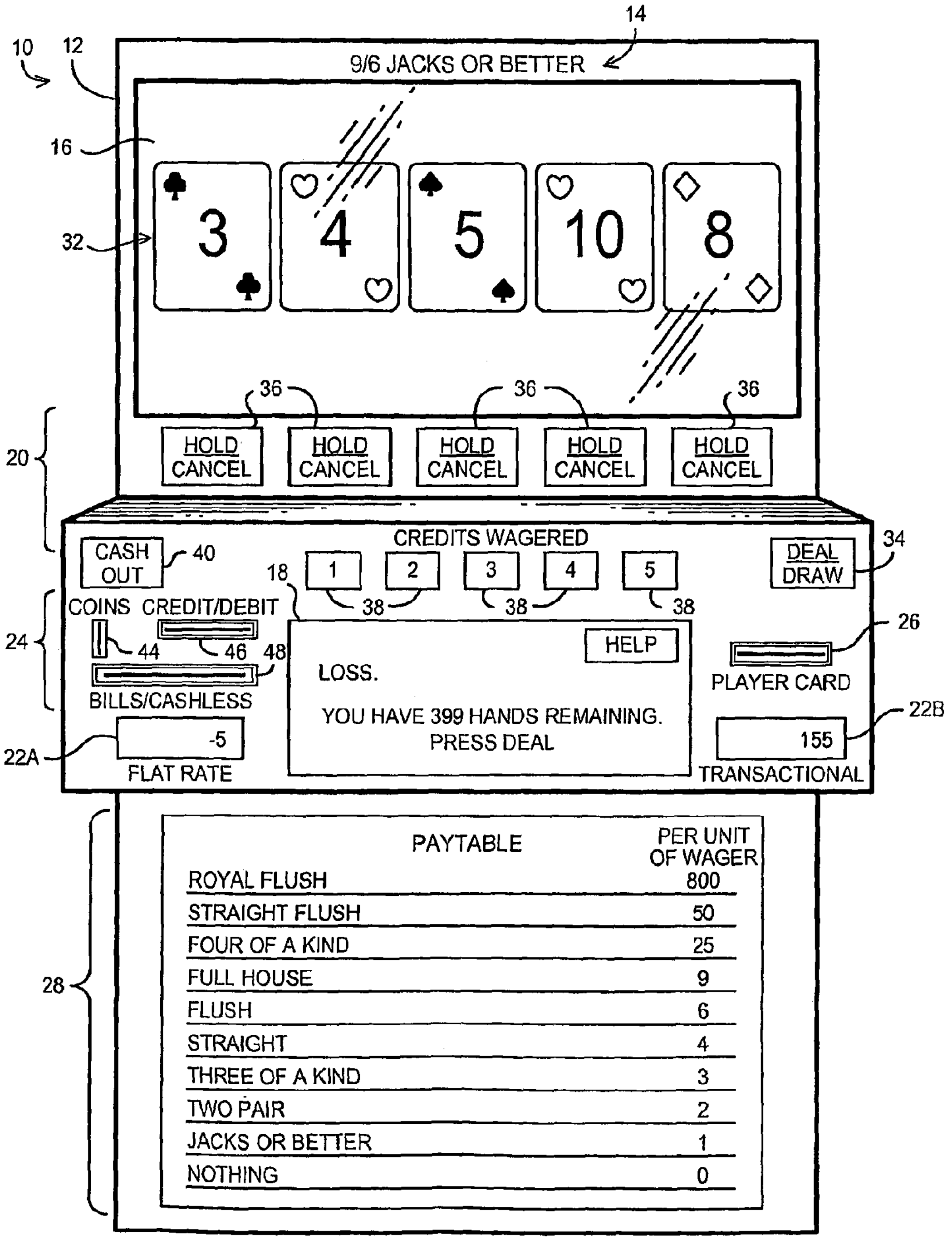
FIG. 9 illustrates the gaming device of FIG. 8 after a single exemplary losing hand.

As illustrated in FIG. 9, the player has a hand that is a loss. The credit meters 22A & 22B are updated (block 168). As flat rate play sessions assume max coin wagers, the cost of the hand is five units of wager. The flat rate credit meter 22A reflects a balance of negative three (0−5=−5) credits. The transactional credit meter 22B reflects a balance of one hundred fifty-five credits (160−5=155). The secondary display 18 outputs a message indicating the loss and the number of remaining hands for the flat rate play session (e.g., 399) (block 170).

The control system determines if the hands that remain count is greater than zero (block 172). If the answer is no, then the flat rate play session is over and the method ends (block 174). If however, the answer to block 172 is yes, then the control system detects whether the player has cashed out (e.g., by pressing cash out button 40) (block 176). If the answer to block 176 is no, then the process repeats. If the player has pressed the cash out button 40, then under the flat rate session, the player receives nothing since the player has a negative balance. However, the player still has credits on the transactional credit meter 22B, so the player receives the credits displayed thereon (block 178).

Figure 10:
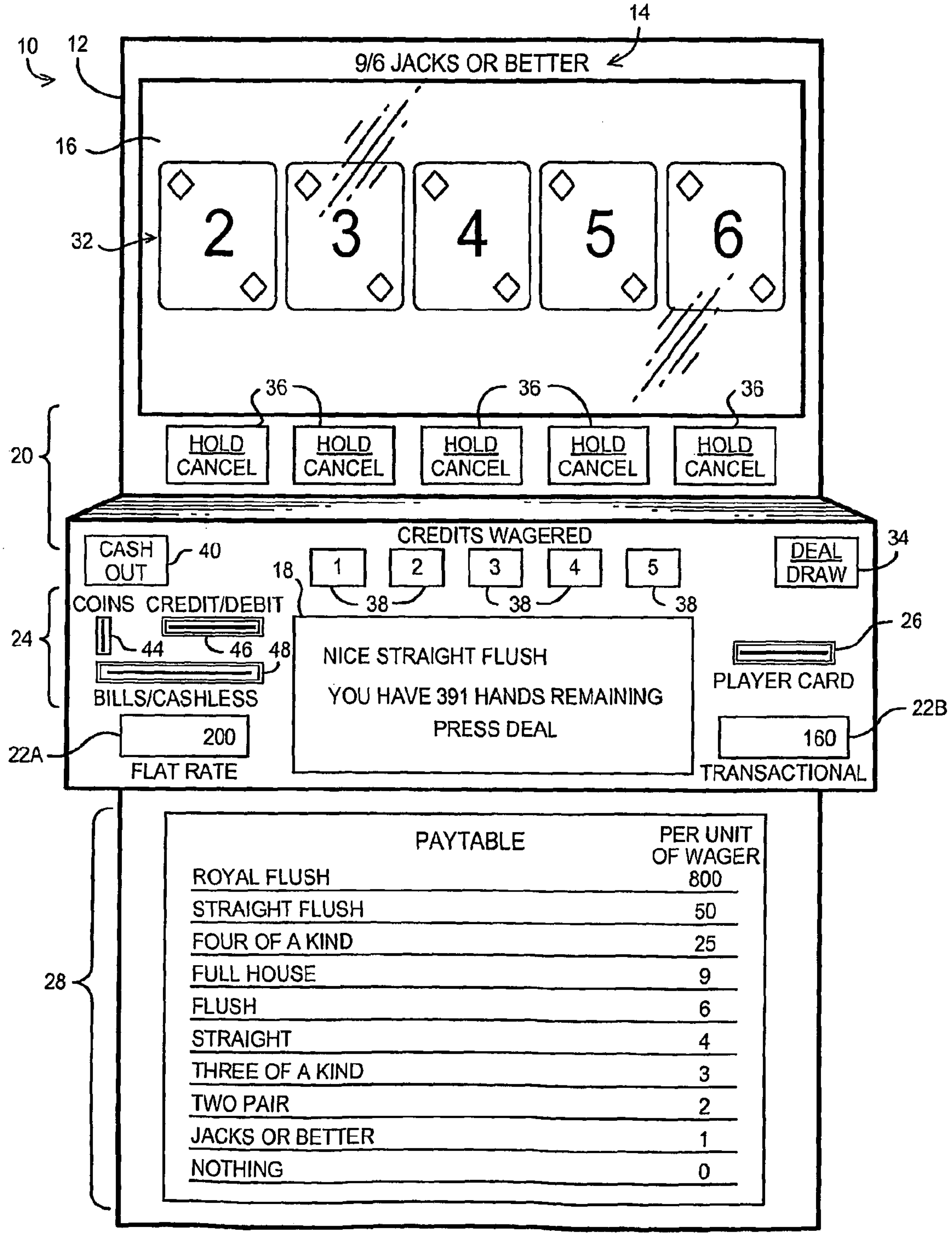
FIG. 10 illustrates the gaming device of FIG. 8 after nine exemplary losing hands and one exemplary winning hand.

For the sake of further example, assume the player has played nine hands, losing each of the first eight hands. The flat rate credit meter 22A would sit at negative forty-five after the ninth hand is dealt. The transactional credit meter 22B would sit at one hundred fifteen. On the ninth hand, the player receives a straight flush. The flat rate credit meter 22A adds two hundred fifty credits (50 credits benefit/unit of wager×5 units of wager for max bet=250). The transactional credit meter 22B adds thirty credits (10 credits benefit/unit of wager×5 units of wager=50). See FIG. 10.

If, at this time, the player presses the cash out button 40 such that block 176 is answered affirmatively, then the player receives the 200 credits displayed on the transactional credit meter 22B. As illustrated, the player receives the higher value of the values displayed on the credit meters 22A, 22B In an alternate embodiment, prior to conclusion of the flat rate play session, the player may only receive the balance displayed on the transactional credit meter 22B. In still another embodiment, the player is queried as to which balance the player would like to receive. In any event, if the player is due a benefit, the benefit is provided through the benefit output device 52 as previously described.

Note that an interesting aspect of the flat rate play session is that the player may continue playing even though the player has a negative balance on the flat rate credit meter 22A so long as the player has hands remaining.

In an alternate embodiment, once the player has a zero balance on the transactional credit meter 22B, future winning hands do not increase the balance on the transactional credit meter 22B since the player has, for the transactional session, already exhausted her equity.

In one embodiment, if the player selects the transactional mode, then the player may play with the transactional paytable 110. The belly glass display 28 may be updated to reflect the new payout values if practical or desired. In an alternate embodiment, if the player selects the transactional mode at block 150, then the player may play transactionally with the paytable illustrated on the belly glass display 28 (i.e., the flat rate paytable). A player may alternatively pay for a premium package, which includes a better paytable if such is offered by the gaming establishment or the gaming device 10.

In the interests of completeness, the present disclosure also provides a brief description of how to derive the transactional paytable 110. The transactional paytable 110 may have payouts selected, which minimize the standard deviation of the game. In one embodiment, an algorithm generates extremely low volatility alternate paytables from the standard paytables used for the flat rate session. This algorithm lowers the payouts in such a way as to minimize the volatility of the paytable, while leaving the frequencies of the individual outcomes unchanged. On each pass of the algorithm, it finds the payout with the greatest variance and decrements it by one. If this brings the payback of the paytable below the desired payback level, the payout is incremented to its previous value and the algorithm tries decrementing the payout with the next highest variance. Once it finds a payout it can decrement without bringing the payback below the target amount, the algorithm starts again. It finishes when it cannot decrement any of the payouts without bringing the payback below the target amount.

Of course, many other methods may be used to determine the payouts for an alternate payout table. The above algorithmic method has been provided as an illustrative example only.

Alternate Embodiments

While the above example decrements both the flat rate credit meter 22A and the transactional credit meter 22B by the same amount (e.g., max coin wager), in one alternative embodiment, the amount decremented from the transactional credit meter 22B could be either more or less than the amount of the wager used by the flat rate credit meter 22A.

In some embodiments, the parallel transactional session may be of a different type of game than the game of the flat rate play session. For example, the flat rate session may utilize a paytable of a 6/9 Jacks or Better game while the parallel transactional session may utilize a paytable of a 20/12 Deuces Wild game.

In at least one embodiment, the parallel transactional session may have a pay table offering payouts higher than those offered in the flat rate session.

In one embodiment, the player may be able to choose to end a flat rate session and select the balance on the transactional credit meter 22B only if certain parameters are achieved or conditions are satisfied. Examples of such parameters or conditions include, but are not limited to: a certain number (e.g., a minimum number) of hands have been played; there are a certain minimum number of hands left in the session; a particular outcome has been achieved (e.g. the player may select the transactional credit meter 22B balance only after an outcome of four of a kind has been achieved); and the like.

In some embodiments, the transactional credit meter 22B balance is not output at all times during a flat rate play session. For example, the transactional credit meter 22B balance may only be output in response to the occurrence of one or more qualifying events.

In some embodiments, only a single credit meter balance may be displayed as a default credit meter balance to the player while the second credit meter balance may be selectively viewed by the player. For example, in one embodiment only the flat rate credit meter 22A may be displayed to the player as a default display. However, the player may at any time indicate a desire to view the transactional credit meter 22B. Upon receiving the player's indication of the desire to view the transactional credit meter 22B, the transactional credit meter 22B is presented. For example, the primary display 16 or the secondary display 18 may present the information of the transactional credit meter 22B. In one embodiment, the transactional credit meter 22B may toggle back and forth with the flat rate credit meter 22A. That is, only a single meter is presented, but the information switches back and forth between balances. The switch may be periodic, in response to a player request, or on some other basis as practical or desired. In another embodiment, the transactional credit meter 22B may be combined as a split screen with the flat rate credit meter 22A. In one embodiment in which the flat rate credit meter 22A is presented in response to a player request, this flat rate credit meter 22A may be presented for a predetermined period of time from the time of the player's request (e.g., 30 seconds) or until the player indicates that this credit meter balance should no longer be output.

In some embodiments, the transactional credit meter 22B is output (i) upon an initiation of the flat rate play session; (ii) in response to a player request; and/or (iii) in response to the credit meter balance reaching zero credits.

In still another embodiment, the paytables used for the flat rate game and the parallel transactional may be varied between multiple paytables. For example, in one hand, a 6/9 Jacks or Better table could be used. In a second hand a 5/8 Jacks or Better table could be used. The actual paytable may be presented before or after the hand is resolved by the player. Other paytables with differing amounts may be used. For example, a super jackpot paytable could be used to entice players into playing for the Royal Flush in hopes that the super jackpot table would be selected. The paytable selection may be random, according to a set schedule, or otherwise determined. Likewise, the paytable may be used for one or more hands. Still other variations on this concept are contemplated.

While the present invention has focused on a poker embodiment, the teachings described herein are readily extended to other sorts of gaming devices including slots, video slots, video keno, and the like.

ALTERNATE EXAMPLE

While the example of FIG. 7 is helpful, an alternate example is also presented. In one embodiment, a flat rate session is begun in which the player inserts $40 into the cash acceptor 48. The flat rate session allows the player to play four hundred hands of max coin quarter 6/9 Jacks or Better video poker with a flat rate credit meter 22A balance that starts at zero credits. The flat rate play session is played using a first paytable 100 (see FIG. 5), the first paytable having a typical payback percentage for this type of game (e.g. a 95-99% payback percentage). For each hand played, $1.25 worth of credits is subtracted from the flat rate credit meter 22A. Any wins are added to the flat rate credit meter 22A. Throughout the session, the credit balance may go negative. At the end of the session, any positive flat rate credit meter balance may be cashed out by the player. If a negative balance exists at the end of the session, the player owes nothing and may walk away from the gaming device 10.

While these four hundred hands of video poker are played, however, an additional parallel transaction session is conducted by the gaming device 10. This parallel transactional session is the same 6/9 Jacks or Better game, but it is played using a second and distinct 75% payback table 110 and a separate transactional credit meter 22B that starts with an amount of credits equivalent to forty dollars (instead of a credit meter balance equivalent to zero dollars, as in the flat rate play session). Since the unit of wager is twenty-five cents, one hundred sixty credits are posted to the transactional credit meter 22B. The transactional paytable 110 represents a lower payback percentage than the concurrent 6/9 Jacks or Better game, which (as described above and depending on the ability of the player) may pay back in the range of 95-99%. The types of winning outcomes available via each of the flat rate session and the concurrent transactional session are identical. For example, a royal flush, a straight flush, a four-of-a-kind, a full house, a flush, a straight, a three-of-a-kind, a two pair, and a pair may be the winning outcomes for each paytable 100, 110. However, the payouts corresponding to a particular winning outcome may differ from one paytable to the other. After each outcome is obtained and evaluated as a result of a particular hand, the flat rate credit meter 22A is adjusted based on the paytable 100 in effect for the flat rate session and the parallel transactional credit meter 22B is adjusted based on the second paytable 110 in effect for the transactional session. For example, if a player obtains an outcome of a full house, use of the flat rate session paytable 100 may result in a payout of forty-five credits being added to the flat rate session credit meter 22A, while use of the parallel transactional session paytable 110 may result in a payout of twenty-five credits being added to the transactional credit meter 22B. Although the payout for the parallel session is, in this case, lower than the payout corresponding to the same outcome for the flat rate session, the parallel session has the advantage with respect to the size of the credit balance, which starts at an amount of credits equivalent to $40 instead of zero. In this example, the player may end the session at any time and receive the parallel transactional session cashout value (i.e., the current amount of credits in the credit meter 22B balance at any time). In some embodiments, the player may not be allowed to cash out the credit meter balance corresponding to the flat rate play session until the number of hands defined by the flat rate play session (in this case four hundred) are completed.

In one embodiment, once the value of the credit meter 22B reaches zero credits, it stays there for the remainder of the session, even though the player may keep playing any remainder of the four hundred hands. This status reflects the fact that, as far as the parallel transactional session goes, the player lots his money. As noted, an in contrast, the credit meter balance of the flat rate play session may become negative at times as the player wagers.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

A player "wagers" at least a single "unit of wager" to pay for a game start. In many gaming devices, a unit of wager may be referred to as a credit. Many gaming devices allow multiple credits to be wagered concurrently in exchange for an improved paytable or more paylines. A unit of wager may be equivalent to a full dollar amount ($1, $5), a fractional dollar amount, a coin (e.g., $0.05 (nickel) or $0.25 (quarter)), or specified amount of another currency (e.g., a specified number of comp points). Some paytables may be expressed as a number of coins won relative to a number of coins wagered. In such instances, the term coin is the same as a unit of wager. Because gaming devices are embodied in different denominations, it is relevant to note that a coin, credit, or unit of wager on a first device may not be identically valued as a coin, credit, or unit of wager on a second device. For example, a credit on a quarter slot machine (on which the credit is equivalent to $0.25) is not the same as a credit on a five dollar slot machine (on which the credit is equivalent to $5.00). Accordingly, it should be understood that in embodiments in which a player may cash out credits from a first gaming device that operates based on a first denomination (e.g., a quarter-play slot machine) and establish, using only the cashed out credits, a credit balance on a second gaming device that operates based on a second denomination (e.g., a nickel-play slot machine), the player may receive a different number of credits on the second gaming device than the number of credits cashed out at the first gaming device.

"Determining" something can be performed in a variety of manners and therefore the term "determining" (and like terms) includes calculating, computing, deriving, looking up (e.g., in a table, database or data structure), ascertaining, recognizing, and the like.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A method comprising:

determining, via a server computer operable to facilitate a wagering game on a gaming device, an outcome on the gaming device, the outcome comprising at least one game indicia;

determining, via the processor, a first benefit won as a direct result of the outcome according to a first paytable associated with a flat rate play session by determining the first benefit as corresponding to the at least one game indicia in the first paytable;

adding the first benefit to a first credit meter balance associated with the flat rate play session;

determining a second benefit won as a direct result of the outcome according to a second paytable associated with a transactional play session by determining the second benefit as corresponding to the at least one game indicia in the second paytable; and adding the second benefit to a second credit meter balance associated with the transactional play session in parallel with adding the first benefit to the first credit meter balance.

2. The method of claim 1, wherein the computer comprises a server operable to communicate with a gaming device over a network.

3. The method of claim 1 further comprising outputting a value of the second credit meter balance.

4. The method of claim 3 wherein outputting the second credit meter balance comprises selectively outputting the second credit meter balance.

5. The method of claim 1 further comprising providing distributing proceeds associated with either the first or the second credit meter balance to a player.

6. The method of claim 5 wherein distributing proceeds comprises initially receiving a cash out command from the player.

7. The method of claim 5 wherein distributing proceeds comprises receiving a selection from the player as to whether first proceeds associated with the first credit meter balance or second proceeds associated with the second credit meter balance are to be distributed.

8. The method of claim 1 further comprising decrementing both the first and second credit meter balances by an amount wagered by a player.

9. The method of claim 1 wherein the first paytable is more favorable than the second paytable.

10. The method of claim 1 wherein determining the outcome comprises determining the outcome at a server and transmitting the outcome to the gaming device.

11. The method of claim 1 wherein determining the outcome comprises determining the outcome on a mobile terminal.

12. The method of claim 1 further comprising detecting a cash out event from the player.

13. The method of claim 12 further comprising determining which credit meter balance is higher and distributing proceeds associated with the higher credit meter balance.

14. The method of claim 12 further comprising determining if the flat rate play session is concluded and distributing proceeds associated with the first credit meter balance if the flat rate play session is concluded.

15. The method of claim 12 further comprising determining if the flat rate play session is concluded and distributing proceeds associated with the second credit meter balance if the flat rate play session is not concluded.

16. The method of claim 12 further comprising determining if an eligibility criterion has been satisfied and distributing proceeds associated with one of the credit meter balances based on whether the eligibility criterion has been satisfied.

17. The method of claim 1, wherein outputting an indication of a value of the first credit meter balance comprises displaying the value of the first credit meter balance to a player.

18. The method of claim 3, wherein outputting an indication of the value of the second credit meter balance comprises displaying an indication of the second credit meter balance to a player.

19. A system comprising:

a user interface; and a control system operatively coupled to the user interface and adapted to:

determine an outcome for a wagering game, the outcome comprising at least one game indicia;

determine as a direct result of the outcome a first benefit for the outcome according to a first paytable associated with a flat rate play session by determining the first benefit as corresponding to the at least one game indicia in the first paytable;

add the first benefit to a first credit meter balance associated with the flat rate play session;

determine as a direct result of the outcome a second benefit for the outcome according to a second paytable associated with a transactional play session by determining the second benefit as corresponding to the at lest one game indicia in the second paytable;

add the second benefit to a second credit meter balance associated with the transactional play session in parallel with adding the first benefit to the first credit meter balance; and output an indication of a value of the first credit meter balance.

20. A computer readable medium comprising software with instructions to:

determine an outcome of a wagering game, the outcome comprising a at least one game indicia;

determine as a direct result of the outcome a first benefit for the outcome according to a first paytable associated with a flat rate play session by determining the first benefit as corresponding to the at least one game indicia in the first paytable;

add the first benefit to a first credit meter balance associated with the flat rate play session;

determine as a direct result of the outcome a second benefit for the outcome according to a second paytable associated with a transactional play session by determining the second benefit as corresponding to the at lest one game indicia in the second paytable;

add the second benefit to a second credit meter balance associated with the transactional play session in parallel with adding the first benefit to the first credit meter balance; and output an indication of a value of the first credit meter balance.

21. The system of claim 19 wherein the user interface comprises a mobile terminal.

22. The system of claim 19 wherein the control system comprises a server based processor and the user interface comprises a video poker gaming device.

* * * * *